United States Patent [19]
Dietlein

[11] Patent Number: 4,738,988
[45] Date of Patent: Apr. 19, 1988

[54] NON-SETTLING FOAMS
[75] Inventor: John E. Dietlein, Bay City, Mich.
[73] Assignee: Dow Corning Corporation, Midland, Mich.
[21] Appl. No.: 44,190
[22] Filed: Apr. 30, 1987
[51] Int. Cl.$^4$ .............................................. C08J 9/02
[52] U.S. Cl. ........................................ 521/99; 521/54; 521/103; 521/122; 521/154; 523/218; 523/219
[58] Field of Search ................... 521/54, 103, 99, 122, 521/154; 523/218, 219

[56] References Cited
U.S. PATENT DOCUMENTS
3,923,705 12/1975 Smith .
4,082,702 4/1978 Harper .
4,433,069 2/1984 Harper ................................ 521/154

Primary Examiner—Morton Foelak
Attorney, Agent, or Firm—Edward C. Elliott

[57] ABSTRACT

Polydiorganosiloxane compositions useful for producing flame resistant foam of the type containing finely divided nonmetallic fibrous heat resistant material and finely divided nonmetallic cellular heat resistant material tend to separate upon long time storage. The compositions remain homogeneous upon storage when at least 0.1 weight percent of fume silica is included in the composition during the mixing of the ingredients before storage.

5 Claims, No Drawings

NON-SETTLING FOAMS

BACKGROUND OF THE INVENTION

1. Field of the Invention

This invention relates to flame retardant polyorganosiloxane foams.

2. Background Information

Polydiorganosiloxane foams can be rendered flame retardant using materials such as platinum and carbon black that do not evolve noxious or toxic vapors at elevated temperatures. Compositions have been developed which are useful for filling the spaces left through building walls and floors when pipes, electrical conduits, ventilation ducts, and such are installed. These foams are used to fill the spaces so as to prevent the passage of smoke vapors and water in the event of a fire in the building.

An early flame retardant foam was described by Smith in U.S. Pat. No. 3,923,705. issued Dec. 2, 1975. A syntactic polyurethane foam having flexible fibers and microballons to impart a cellular structure was disclosed by Harper in U.S. Pat. No. 4,082,702. issued Apr. 4, 1978. A flame retardant polyorganosiloxane foam containing platinum, finely divided nonmetallic, fibrous heat resistant material and finely divided nonmetallic, cellular heat resistant material is disclosed by Harper in U.S. Pat. No. 4,433,069, issued Feb. 21, 1984.

It has been found that compositions of the type used by Harper in U.S. Pat. No. 4,433,069 are subjected to severe separation of the ingredients upon storage for long periods of time such as several months. The cellular fillers tend to rise to the top while the fibrous and granular fillers tend to fall to the bottom. It is very difficult to remix the compositions once they have separated and is a cause of great concern to the user of the composition. Since the ingredients react to form a foam, it is necessary to store the ingredients as two packages, which are mixed together for use. Both of these packages are subject to settling, which means the user has to mix each package separately, then mix them together in order to produce a useful product.

SUMMARY OF THE INVENTION

Polyorganosiloxane compositions useful for producing foam of the type containing platinum catalyst, finely divided nonmetallic fibrous heat resistant material, and finely divided nonmetallic cellular heat resistant material can be prevented from separating upon storage by the addition of at least 0.1 parts by weight of fume silica, based upon 100 parts by weight of the foamable composition.

DESCRIPTION OF THE INVENTION

This invention relates to a method of producing a polydiorganosiloxane composition capable of producing a blown foam at room temperature and which comprises (1) at least 5 parts by weight per million parts by weight of said foam of platinum in elemental or chemically combined form, said foam having uniformly dispersed therein, (2) at least 0.1 percent, based upon the weight of said foam, of at least one finely divided nonmetallic, fibrous heat resistant material. and (3) at least 0.1 percent, based upon the weight of said foam, of at least one finely divided nonmetallic, cellular heat resistant material, wherein the improvement comprises, the addition of (4) at least 0.1 percent, based upon the weight of said foam, of fumed silica, to give a composition which does not separate upon storage for long periods of time.

A preferred method is one in which the polydiorganosiloxane composition also contains (A) at least one organohydrogensiloxane containing at least three silicon-bonded hydrogen atoms per molecule and an average of no more than one hydrogen atom per silicon atom, (B) at least one hydroxyl compound selected from the group consisting of silanols, siloxanols, and water, and (C) at least one polydiorganosiloxane selected from the group consisting of hydroxyl-containing polydiorganosiloxanes and triorganopolysiloxyendblocked polydiorganosiloxanes containing at least two silicon-bonded vinyl groups per molecule, the concentration of said polydiorganosiloxanes being sufficient to impart a viscosity to said foamable and curable composition of from 0.1 to 100 PA.s, measured at 25° C., wherein the organic groups bonded to the silicon atoms of the organohydrogensiloxane, polydiorganosiloxane, silanol, and siloxanol are selected from the group consisting of alkyl containing from 1 to 6 carbon atoms, cycloalkyl containing from 3 to 6 carbon atoms, vinyl, phenyl, and 3,3,3-trifluoropropyl, and any hydroxyl-containing polydiorganosiloxane constitutes at least a portion of (B).

Cured polydiorganosiloxane foams exhibiting a uniquely high resistance to burn-through and disintegration when exposed to flames are described in U.S. Pat. No. 4,433,069, issued Feb. 21, 1984. These desirable properties are attributed to the presence of at least one finely divided nonmetallic fibrous heat resistant material, at least one finely divided nonmetallic cellular heat resistant material, and at least 5 parts per million of platinum in elemental or chemically combined form. When liquid polyorganosiloxane compositions containing these ingredients are prepared and stored, the ingredients tend to separate, due to their great differences in specific gravity. Cellular materials have gravities of less than one, while common granular fillers and fibrous fillers have gravities as high as 2.6. A method of preventing this separation has been discovered which consists essentially of adding greater than 0.1 percent, based upon the weight of the composition, of fume silica.

The amount of fume silica required in a particular composition depends upon the viscosity and concentration of the polydiorganosiloxane in the composition as well as the nature and amount of the other ingredients, in particular the fibrous heat resistant material, the cellular heat resistant material, and any other ingredients such as fillers that are present. The amount of separation that occurs in such compositions will be a function of the specific gravity of the ingredients. When very light cellular heat resistant material, such as expanded perlite having a bulk density as low as 0.1 g per cm$^3$ is used, there is a great tendency for this material to raise to the top of the composition. When a filler such as ground quartz, having a density of 2.65 g per cm$^3$, is used there is a great tendency for this material to settle to the bottom of the composition. It has been found that as more fume silica is added to the composition, the tendency of the composition to separate is diminished. A preferred amount of fume silica is from 0.5 to 10 percent by weight, based upon the weight of the composition. As more fume silica is added, the viscosity of the composition raises. It is possible to add enough fume silica to give a composition which is non-slump when placed on a surface. That is, the composition does not flow under the force of gravity. This allows the placement of the composition in vertical holes without it flowing out of the hole or dripping off the vertical surface. It is preferred that the amount of fume silica used be based upon the composition of the foamable polydiorganosiloxane used, as well as the type and orientation of the surfaces or holes to be protected.

The fume silica used in this invention is the fume silica commonly used as reinforcing filler in silicone rubber. It has a surface area, measured by the BET method, of greater than 50 m$^2$/g. The preferred silica has a surface area of from 150 to 300 m/g.

The materials which constitute the heat resistant fibrous and cellular materials used in this invention are members of the class referred to in the art as "refractory materials." The definition of the term "heat resistant" as applied to the fibrous and particulate materials of the present invention is therefore synonymous with this term as applied to refractory materials. The Kirk-Othmer Encyclopedia of Chemical Technology (second edition, volume 17, published by Interscience Publishers, New York, N.Y.) describes refractory materials as having "softening points well above 1500° C."

Finely divided fibrous forms of silicate glass and other refractory materials, including certain oxides, carbides, and silicates are well known in the art and are commercially available in the form of whiskers, monofilaments, and yarns. For ease of processability during mixing and application of the foam-forming ingredients used in the present invention, the fibers should be less than 20 microns in diameter and less than 50 mm long. Dispersing of the fibers in the foam-forming reactants of this invention is facilitated if the fibers are from 2 to 8 mm long and from 5 to 20 microns in diameter. Most preferably the fibers are about 6 mm long.

Fibrous heat resistant materials that are suitable for preparing foams in accordance with this invention include naturally occurring materials, such as asbestos, and man-made fibers and whiskers formed from glass, carbon, alumina, inorganic silicates such as aluminum silicate and mixtures of aluminum silicate with alkali metal and/or alkaline earth metal silicates. Preferred fibrous heat resistant materials are glass and carbon. Methods for forming fibers from these and other suitable refractory materials are well known in the art.

The cellular particulate material used in the present foams can be hollow glass microspheres or any of the low density cellular particulate refractory materials such as perlite and vermiculite that are commonly employed as packing material and insulation. The density of the cellular material is usually less than 0.5 g. per cm$^3$, preferably less than 0.3 g. per cm$^3$. To avoid processing difficulties when mixing and dispensing the foam-forming reaction mixture, the particles are preferably no larger than 0.3 cm. in diameter.

The organohydrogensiloxane, component (A) used to prepare foams in accordance with a preferred method used in this invention can be any siloxane having an average of at least three silicon-bonded hydrogen atoms per molecule and an average of no more than one silicon-bonded hydrogen atom per silicon atom. The remaining valences of the silicon atoms are satisfied by oxygen or by monovalent hydrocarbyl radicals containing one to six carbon atoms, such as methyl, ethyl, propyl, isopropyl, butyl, tertiary butyl, pentyl, hexyl, cyclohexyl, phenyl, and 3,3,3-trifluoropropyl radicals. Component (A) may contain one or more homopolymer, copolymer or mixture thereof which, in turn, are composed of siloxane units of the following types:
$RSiO_{1.5}$, $R_2SiO$, $R_3SiO_{0.5}$,
$RHSiO$, $HSiO_{1.5}$, $R_2HSiO_{0.5}$,
and $SiO_2$ where R is one of the monovalent hydrocarbyl radicals defined above. Preferably R is methyl, phenyl, or 3,3,3-trifluoropropyl, this preference being based on the availability of the reagents, usually halosilanes, typically employed to prepare the foam-forming reactants.

Some specific examples of component (A) include cyclic polymethylhydrogensiloxanes, copolymers having trimethylsiloxy and methylhydrogensiloxane units, copolymers having dimethylhydrogensiloxy and methylhydrogensiloxane units, copolymers having trimethylsiloxy, dimethylsiloxane and methylhydrogensiloxane units, and copolymers having dimethylhydrogensiloxane, dimethylsiloxane and methylhydrogensiloxane units. Preferably, the constituents of component (A) contain an average of at least five silicon-bonded hydrogen atoms per molecule.

The hydroxyl-containing portion, component (B), of the foamable compositions used in this invention can be water or a silane or siloxane containing an average of from 1.0 to 2.5 silicon-bonded hydroxyl groups per molecule. The hydrocarbon radicals bonded to the silicon atoms of these silanes and siloxanes can be any of those previously disclosed in connection with (A). In addition, the hydroxyl-containing organosilicon compound may contain one or more alkenyl groups, such as vinyl groups, per molecule.

The hydroxyl-containing silane or siloxane portion of component (B) may consist of one or more homopolymer, copolymer, or a mixture of homopolymer and copolymer. Component (B) may contain polyorganosiloxane species of varying molecular weight and hydroxyl content, so long as the average hydroxyl content is within the aforementioned range of from 1.0 to 2.5 hydroxyl groups per molecule, and each silicon atom is bonded to at least one hydrocarbon radical. Typical hydroxylated organosiloxanes include hydroxyl endblocked polydimethylsiloxanes, hydroxyl endblocked polydiorganosiloxanes having siloxane units of dimethylsiloxane and phenylmethylsiloxane, hydroxyl endblocked polymethyl-3,3,3-trifluoropropylsiloxanes, and hydroxyl endblocked polyorganosiloxanes having siloxane units of monomethylsiloxane, dimethylsiloxane, monophenylsiloxane, and diphenylsiloxane.

The hydroxyl-containing siloxanes can be used in combination with hydroxyl-containing silanes such as diphenylmethylsilanol. As long as some hydroxylated organosiloxane polymer having two or more hydroxyl groups per molecule forms a part of component (B), hydroxylated silanes containing an average of from 1.0 up to 2.5 silicon-bonded hydroxyl groups per molecule.

To ensure preparation of acceptable room temperature curable polyorganosiloxane foams, the foamable composition should contain an effective amount of at least one polydiorganosiloxane, component (C), that exhibits a viscosity in the range of from 0.1 to 100 Pa.s at 25° C. and contains an average of at least two groups per molecule selected from silicon-bonded hydroxyl and silicon-bonded vinyl groups. If component (C) contains two or more silicon-bonded hydroxyl groups per molecule, it can also function as at least a portion of component (B). Alternatively, (C) may contain an average of two or more silicon-bonded vinyl groups per molecule. Inclusion of vinyl-containing siloxanes in (C) improves the physical properties, such as tensile strength and resiliency exhibited by the cured foam.

In addition to providing hydroxyl and/or vinyl groups to react with the silicon-bonded hydrogen atoms during formation of the polyorganosiloxane foam, (C), in combination with the other components of the foamable composition, yields a composition that is sufficiently viscous to produce a foam of the desired density by entrapping the required amount of hydrogen generated by reaction of the silicon-bonded hydrogen atoms with the hydroxyl compound(s) present in the foamable composition. The hydrogen should be entrapped while the foamable composition is sufficiently fluid to expand. If the viscosity is too low during hydrogen generation, much of the hydrogen will escape. If the composition polymerizes too rapidly, it may cure to a solid material before sufficient hydrogen has been evolved to form the desired cellular structure. Including polydiorganosiloxane (C) in an amount such that the reaction mixture exhibits a viscosity of at least 0.1 Pa.s at 25° C. usually ensures that the foamable composition will entrap enough hydrogen to produce an elastomeric foam.

As previously disclosed, the foamable composition may contain water as at least a portion of (B). The use of water as a blowing agent for polysiloxane foams is taught in U.S. Pat. No. 4,189,545, which issued on Feb. 19, 1980. This patent discloses that water reacts with the organohydrogensiloxane to generate bubbles of hydrogen gas which are entrapped within the viscous polymerizing siloxane reaction mixture. The concentration of water is from 100 to about 15,000 ppm. based on the weight of the total composition, and the amount of organohydrogen siloxane present should be adjusted accordingly.

If water is the only hydroxyl compound present, the foamable composition must also contain a benzene soluble polydiorganosiloxane with silicon-bonded vinyl groups in an amount that will impart a viscosity of greater than 0.1 Pa.s, measured at 25° C., to the reaction mixture. Foamable compositions comprising a vinyl-containing polydiorganosiloxane, water, a organohydrogensiloxane and a platinum catalyst are disclosed in the aforementioned U.S. Pat. No. 4,189,545. This patent is hereby incorporated in its entirety by reference to show one type of foamable polyorganosiloxane composition that can be employed in combination with finely divided fibrous and cellular heat resistant materials to prepare fire retardant foams in accordance with the present method.

The strength of cured polyorganosiloxane foams prepared in accordance with the present method using a hydroxylated silane or siloxane can be increased by including as at least a portion of (C) one or more of the aforementioned benzene soluble vinyl-containing triorganosiloxy terminated polydiorganosiloxanes having an average of about two vinyl groups per molecule in amounts up to 85 percent, preferably up to 50 percent, based on the total weight of the vinyl-containing triorganosiloxy terminated polydiorganosiloxane and the hydroxyl-containing silane or siloxane. Most preferably the vinyl-containing polydiorganosiloxane portion of (C) constitutes from 20 to 40% of the combined weight of polydiorganosiloxane and hydroxylated organosilicon compound. The vinyl groups of the polydiorganosiloxane are preferably present as terminal diorganovinylsiloxy groups and the remaining hydrocarbon groups in the molecule are as previously defined for the substituent R.

The vinyl-containing polydiorganosiloxane portion of (C) can be a mixture or a single species. Examples of these types of polymers are widely shown in the prior art such as in U.S. Pat. Nos. 3,445,420 and 3,453,234. both which are hereby incorporated by reference to show vinyl-containing triorganosiloxy terminated polydiorganosiloxanes.

If no vinyl-containing polydiorganosiloxanes are present in (C), the relative concentrations of (A) and hydroxyl-containing organosilicon compound(s) are sufficient to provide a molar ratio of silicon-bonded hydrogen atoms to silicon-bonded hydroxyl groups of from 2.5 to 40, preferably from 4 to 10. Ratios of less than 2.5 provide foams that are too friable and weak to be useful in the known applications. The same problem exists above the upper limit. Within this range of molar ratios, the foam density will decrease as the ratio increases if other variables remain constant.

If (C) includes one or more vinyl-containing polydiorganosiloxanes, the molar ratio of silicon-bonded hydrogen atoms to silicon-bonded hydroxyl groups can be varied over a range of from 0.5 to 40. It is not fully understood why this ratio can be varied more broadly with these ingredients, however, the reactions of such mixtures are complex and have not been fully studied.

When water is used as (B) of the present foamable compositions. U.S. Pat. No. 4,189,545 teaches that the molar ratio of silicon-bonded hydrogen atoms to water should be at least 0.2.

The molecular weight of any particular ingredient is not significant, providing that it is compatible or dispersible in the total reaction mixture, and the final composition exhibits a viscosity within the range defined in this specification.

Components (A), (B), and (C) are reacted in the presence of a platinum-containing catalyst, component (1). The catalyst can be any of the platinum catalysts conventionally employed for the reaction of hydroxyl groups with silicon-bonded hydrogen atoms, and can range from platinum metal deposited on suitable carriers such as silica gel or powdered charcoal, to platinic chloride, salts of platinum, and chloroplatinic acid. Any of these forms will function in the instant curing system, providing that it is soluble or readily dispersible as minute particles in the reaction mixture. If a clear or colorless foam is desired, (1) is preferably chloroplatinic acid, which is available as the hexahydrate or in anhydrous form. Another preferred platinum-containing catalyst is a chloroplatinic acid catalyst complex prepared by the method described in U.S. Pat. No. 3,419,593 which is hereby incorporated by reference. An example of a complex is one prepared by mixing chloroplatinic acid hexahydrate with symmetrical divinyltetramethyldisiloxane, optionally in the presence of an alcohol as a solvent. Additional examples of (1) catalysts include, among others,

$PtCl_2[P(CH_2CH_2CH_3)_3]_2$, platinum bromide, a complex of a platinous halide with an olefin such as ethylene, propylene, butylene, cyclohexene, or styrene, and other complexes disclosed in the aforementioned U.S. Pat. No. 3,923,705 to Smith, which is hereby incorporated in its entirety by reference.

Component (1) can be present in an amount sufficient to provide from 5 to 200 parts by weight of platinum per one million parts by weight of foamable and curable composition (ppm). Preferably, (1) is present in amounts to provide from 10 to 50 ppm platinum. Catalyst concentrations which provide less than 5 ppm of platinum usually will not result in acceptable foam formation and concentrations equivalent to more than 200 ppm of platinum are uneconomical and may make the composition too reactive. Higher concentrations of catalyst should be used with a platinum catalyst inhibitor, since the rates of the foaming and curing reactions increase with increasing platinum concentration. If these rates are too rapid, foaming and curing can occur prematurely as the reactants are being mixed and before the resultant mixture has been transported to the location where the foam is to be formed.

If it is desired to increase the time interval between combining of the siloxane reactant and initiation of the foaming reaction (also known as "pot life") without decreasing the concentration of platinum catalyst, this can be achieved using one of the known platinum catalyst inhibitors such as cyclic polymethylvinylsiloxanes and the acetylenic compounds such as 3-methyl-1-butyn-3-ol that are disclosed in U.S. Pat. No. 3,445,420, which issued on May 20, 1969, and is hereby incorporated by reference. Inhibitors are usually employed at relatively low concentration levels. For example, cyclic polymethylvinylsiloxanes are used at concentrations below 2%, based on the weight of reactants employed to prepare the foams.

Further discussion of foams containing ingredients (1), (2), and (3) are found in U.S. Pat. No. 4,433,069, issued Feb. 21, 1984, which is hereby incorporated by reference to show such foams and methods of mixing and producing the compositions.

Because the ingredients react to form a foam when all are present, the compositions are stored in at least two containers. Without the fume silica of this invention, the contents of the containers tend to separate on storage. Before use, each container must be stirred to give a uniform mixture, then the parts of the composition are mixed together. The contents of the separate containers are difficult to disperse after long storage unless the fume silica of this invention is present to prevent the separation of the ingredients.

The method of this invention yields compositions which do not separate upon storage, so the parts of the composition can be easily combined at the time of foam production by mixing the parts together. The mixed composition is placed in position where it is desired to have a foam and allowed to foam into place. The cured foam is useful in plugging holes which penetrate building walls, thereby preventing flame from going through the wall during a fire.

The following examples are included for illustrative purposes only and should not be construed as limiting the invention which is properly set forth in the appended claims. All parts are parts by weight.

EXAMPLE 1

A 2-part composition illustrating this invention was prepared. Part A was prepared by mixing in a stirred mixer, 56.7 parts of a mixture of hydroxyl endblocked polydimethylsiloxane with an approximate number average molecular weight of 40,000 with cyclic polydimethylsiloxane with a DP of from 4 to 30, the mixture having a viscosity of about 13.5 Pa.s at 25° C. 43.3 parts of dimethylvinylsiloxy endblocked polydimethylsiloxane having a viscosity of about 0.4 Pa.s at 25° C., 21.7 parts of ground quartz, 9.8 parts of pigment, 0.6 parts of chloroplatinic acid complex of divinyltetramethyldisiloxane diluted with dimethylvinylsiloxy endblocked polydimethylsiloxane to provide 0.7 weight percent platinum, and 19.4 parts of perlite (available as Ryolex (R) Perlite-40C from the Silbrico Corporation), and 1.4 parts of fume silica having a surface area of about 250 m2/g.

Part B was prepared by mixing 100 parts of the above hydroxyl endblocked polydimethylsiloxane, 19.2 parts of hydroxyl endblocked polydimethylsiloxane fluid having a viscosity of about 0.04 Pa.s at 25*C and about 4 weight percent silicon-bonded hydroxyl radicals, 14.6 parts of trimethylsiloxy endblocked polymethylhydrogensiloxane having a viscosity of about 0.13 Pa.s at 25° C. and a silicon-bonded hydrogen atom content of about 1.6 percent by weight, 3.6 parts of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent, 0.3 parts of methylvinylcyclosiloxane, 8.2 parts of chopped glass fibers, 24.8 parts of the above perlite, 27.6 parts of ground quartz and 1.6 parts of the above fume silica.

Each part was placed in a test tube (250 mm in length and 25 mm in diameter) and allowed to stand undisturbed. No visible signs of separation of the ingredients occurred over a three month period. A similar sample had not separated over a one year period, except for less than 2 mm of clear liquid on the surface.

COMPARATIVE EXAMPLE

Two compositions were prepared which were identical to the above two samples in example 1. except there was no fume silica present.

When tested as above, the ingredients separated with the perlite rising to the top of the sample and the ground quartz and glass fiber settling to the bottom. After one week, the separation was complete.

EXAMPLE 2

Two compositions were prepared that were identical to Example 1, except each portion contained 2.6 parts of fume silica. One year after storage of the samples, there was only minor separation, with less than 2 mm of clear liquid visible on the surface.

EXAMPLE 3

Two compositions were prepared that were identical to Example 1, except each portion contained 5.2 parts of fume silica. After storage for one year, less than 2 mm of clear liquid was visible on the surface. These samples had a viscosity such that the material was of a non-slump character, that is, when the material was removed from the container and placed on a surface, it did not flow, but held its position.

That which is claimed is:

1. A method for preparing a flame retardant room temperature curable polyorganosiloxane foam comprising
 (I) forming a homogeneous reactive composition by blending together
  (A) at least one organohydrogensiloxane containing at least three silicon-bonded hydrogen atoms per molecule and an average of no more than one hydrogen atom per silicon atom, (B) at least on hydroxyl compound selected from the group consisting of silanols, siloxanols, and water, and (C) at least one polydiorganosiloxane selected from the group consisting of hydroxyl-containing polydiorganosiloxanes and triorganopolysiloxyendblocked polydiorganosiloxanes containing at least two silicon-bonded vinyl groups per molecule. the concentration of said polydiorganosiloxanes being sufficient to impart a viscosity to said foamable and curable composition of from 0.1 to 100 Pa.s, measured at 25° C., wherein the organic groups bonded to the silicon atoms of the organohydrogensiloxane, polydiorganosiloxane, silanol, and siloxanol are selected from the group consisting of alkyl containing from 1 to 6 carbon atoms, cycloalkyl containing from to 6 carbon atoms, vinyl, phenyl, and 3,3,3-trifluoropropyl, and any hydroxyl-containing polydiorganosiloxane constitutes at least a portion of (B), (1) at least 5 parts by weight per million parts by weight of said foam of platinum in elemental or chemically combined form, said foam having uniformly dispersed therein, (2) at least 0.1 percent, based upon the weight of said foam, of at least one finely divided nonmetallic, fibrous heat resistant material, and (3) at least 0.1 percent, based upon the weight of said foam, of at least one finely divided nonmetallic, cellular heat resistant material, wherein the improvement comprises, the addition of (4) at least 0.1 percent, based upon the weight of said foam, of fumed silica, to give a composition which does not separate upon storage for long periods of time, and (II) allowing said reactive composition to form a cured polyorganosiloxane foam exhibiting an increased resistance to burn-through relative to polydiorganosiloxane foams prepared using either a fibrous or a cellular heat resistant material.

2. The method of claim 1 in which component (2) is at least one member selected from the group consisting of glass, carbon, silicon carbide, silicon nitride, zircon, the alkali metal titanates, boron carbide, and silicates and oxides of zirconium, aluminum, chromium, magnesium, and calcium.

3. The method of claim 1 in which component (3) is at least one member selected from the group consisting of hollow glass microspheres, perlite, and vermiculite.

4. The method of claim 1 in which component (4) is from 0.5 to 10 percent.

5. The polydiorganosiloxane composition produced by the method of claim 1.

* * * * *